US011514111B2

(12) United States Patent
Rinzler et al.

(10) Patent No.: US 11,514,111 B2
(45) Date of Patent: Nov. 29, 2022

(54) SNAP-TO-GRID SITUATIONAL AWARENESS SYSTEM

(71) Applicant: 1Q, LLC, Atlanta, GA (US)

(72) Inventors: Keith Rinzler, Sandy Springs, GA (US); Ryan Cino, Decatur, GA (US); Brian Scully, Marietta, GA (US)

(73) Assignee: 1Q, LLC, Atlanta, GA (US)

( * ) Notice: Subject to any disclaimer, the term of this patent is extended or adjusted under 35 U.S.C. 154(b) by 50 days.

(21) Appl. No.: 17/355,136

(22) Filed: Jun. 22, 2021

(65) Prior Publication Data

US 2021/0319065 A1 Oct. 14, 2021

Related U.S. Application Data

(63) Continuation of application No. 16/026,597, filed on Jul. 3, 2018, now abandoned.

(60) Provisional application No. 62/554,485, filed on Sep. 5, 2017.

(51) Int. Cl.
| | |
|---|---|
| *G06F 16/00* | (2019.01) |
| *G06F 16/9038* | (2019.01) |
| *H04W 4/029* | (2018.01) |
| *G06F 17/18* | (2006.01) |
| *G06F 16/29* | (2019.01) |
| *H04L 67/306* | (2022.01) |
| *H04W 4/021* | (2018.01) |
| *H04L 69/28* | (2022.01) |
| *G06F 16/9537* | (2019.01) |
| *G01S 5/02* | (2010.01) |
| *H04W 4/21* | (2018.01) |

(52) U.S. Cl.
CPC ...... *G06F 16/9038* (2019.01); *G01S 5/02524* (2020.05); *G06F 16/29* (2019.01); *G06F 16/9537* (2019.01); *G06F 17/18* (2013.01); *H04L 67/306* (2013.01); *H04L 69/28* (2013.01); *H04W 4/021* (2013.01); *H04W 4/029* (2018.02); *H04W 4/21* (2018.02)

(58) Field of Classification Search
CPC .. G06F 16/9038; G06F 16/29; G06F 16/9537; G06F 17/18; G01S 5/02524; H04L 67/306; H04L 69/28; H04W 4/021; H04W 4/029; H04W 4/21
See application file for complete search history.

(56) References Cited

U.S. PATENT DOCUMENTS

| | | | |
|---|---|---|---|
| 8,151,194 B1 * | 4/2012 | Chan | G06F 3/01 709/224 |
| 8,751,427 B1 * | 6/2014 | Mysen | H04W 4/024 705/347 |
| 9,585,228 B2 * | 2/2017 | Patel | H04W 12/068 |

(Continued)

*Primary Examiner* — Debbie M Le
(74) *Attorney, Agent, or Firm* — Mehrman Law Office; Michael J. Mehrman

(57) ABSTRACT

A snap-to-grid situational awareness system that efficiently provides geographic, demographic and topical interest awareness information obtained from the location reporting mobile communication devices. The snap-to-grid feature allows demographic data for situational awareness statistics to be computed, stored and displayed on a snap-to-grid coordinate basis. This innovation greatly improves the functionality of a situational awareness system whole reducing memory and computing resources utilized when providing situational awareness functionality.

20 Claims, 10 Drawing Sheets

(56) References Cited

U.S. PATENT DOCUMENTS

| | | | |
|---|---|---|---|
| 9,894,077 B2* | 2/2018 | Rinzler | H04W 4/02 |
| 9,965,556 B2* | 5/2018 | Rinzler | G06Q 20/29 |
| 9,973,875 B2* | 5/2018 | Schwartz | H04W 4/12 |
| 10,013,494 B2* | 7/2018 | Poliakov | G06F 16/9537 |
| 10,594,777 B2* | 3/2020 | Brune | H04M 1/72412 |
| 2010/0070931 A1* | 3/2010 | Nichols | G06F 3/0488 |
| | | | 715/863 |
| 2010/0211863 A1* | 8/2010 | Jones | G06F 40/174 |
| | | | 715/224 |
| 2011/0072071 A1* | 3/2011 | Macwan | H04W 4/023 |
| | | | 709/206 |
| 2019/0037358 A1* | 1/2019 | Jenkins | H04L 61/5007 |

* cited by examiner

30 Snap-To-Grid Member Location Database

Location Tracking Data   Member: Melanie Zimmerman   32n

Location Tracking Data   Member: Mark Burfield   32b

Location Tracking Data   Member: George Burdell   32a

| Date | Time Interval | Snap-to-Grid Coordinate | Coordinate Landmark |
|---|---|---|---|
| 12/21//2016 | 12:00:00 | 33.749; 84.387 | 125 Highpoint Rd Atlanta, GA |
| 12/21//2016 | 12:10:00 | 33.765; 84.425 | 6045 Glenridge Dr Atlanta, GA |
| 12/21//2006 | 12:20:00 | 33.762; 84.45 | Interstate 75/85 Mile Mark 257 |
| 12/21//2016 | 12:30:00 | 33.770; 84.52 | Atlanta Airport |
| ... | ... | ... | ... |

*FIG. 3*

SNAP-TO-GRID SITUATIONAL AWARENESS SYSTEM

REFERENCE TO RELATED APPLICATIONS

This application claims priority to U.S. patent application Ser. No. 16/026,597 filed Jul. 3, 2018, which claim priority to U.S. Provisional Application Ser. No. 62/554,485 filed Sep. 5, 2017, which are incorporated by reference.

TECHNICAL FIELD

The present invention relates to systems using location reporting mobile communication devices such as smartphones and, more particularly, to a "snap-to-grid" system using information obtained from the location reporting of mobile communication devices.

BACKGROUND OF THE INVENTION

Many people today carry sophisticated mobile communications devices, such as smartphones and tablets, almost all the time. These devices provide a wide range of functions in additional to traditional telephone calls including location tracking, social media, email, text, and so forth. Although basic location tracking services are available for small groups, such as families that register their devices using a common app, there is very little ability obtain a greater degree of situational awareness concerning mobile communication devices located nearby or in a particular area of interest.

Situational awareness and instant response systems have been developed that allow a user of a mobile communications device to obtain real-time information about the users of other mobile communications device in selected areas of interest. For example, a user may obtain real-time demographic data about users of other mobile communications devices within 100 feet, or in a specified geographic area. While this is a powerful capability, it is generally limited to real-time information. There is very limited ability to obtain historical information about the presence of mobile communication devices in particular areas over selected periods of time. This type of data would be valuable for a host of purposes, such as demographic trend analyses, commercial foot traffic reviews, personnel tracking, traffic studies, and so forth. There is, therefore, a continuing need for situational awareness information concerning mobile communications devices in particular areas over selected periods of time.

SUMMARY OF THE INVENTION

The present disclosure meets the need described above by facilitating a snap-to-grid system that can efficiently provide geographic, demographic and topical interest awareness information obtained from location reporting mobile communication devices in particular areas over selected periods of time. The snap-to-grid feature can allow demographic data for situational awareness statistics to be computed, stored and displayed on a snap-to-grid coordinate basis. This innovation can reduce memory and computing resources utilized when providing situational awareness functionality.

An embodiment of the invention comprises a method for providing situational awareness information associated with mobile communication devices. Creating a snap-to-grid database comprises (a) for a selected geographic area, receiving location tracking data from a plurality of mobile communication devices for a time interval, (b) for each mobile communication device providing the location tracking data for the time interval, determining a predominant snap-to-grid geographic reference point for the time, (c) for each mobile communication device providing the location tracking data for the time interval, storing the predominant snap-to-grid geographic reference point for the time interval in a location record for the mobile communication device in a snap-to-grid database, (d) for each mobile communication device providing the location tracking data for the time interval, obtaining or updating profile data for a user associated with the mobile communication device, (e) for each mobile communication device providing the location tracking data for the time interval, storing or updating the profile data in association with the location record for the mobile communication device in the snap-to-grid database, and (f) continually incrementing the time interval and repeating steps (a) through (e) for the incremented time interval. Providing situational awareness for mobile communication devices represented in the snap-to-grid database comprises receiving an insight analysis query identifying location and time period data for mobile communication devices represented in the snap-to-grid database, identifying snap-to-grid geographic reference points and time intervals responsive to the insight analysis query, identifying mobile communication devices responsive to the insight analysis query, identifying profile data for responsive mobile communication devices, generating an insight analysis displays reflecting member presence and profile statistics responsive to the insight analysis query, and presenting the insight analysis display.

In a particular embodiment, the profile data may include demographic data obtained from one or more of the mobile communication devices, social media files associated with the mobile communication devices, subject matter of interest data obtained from social media files associated with the mobile communication devices, subject matter of interest data obtained from social media files associated with the mobile communication devices, data obtained from a public offender database, data obtained from an enrollment database, data obtained from a registration database, and data obtained from an affiliation database. In addition, the insight analysis display may further include demographic statistics for users associated with mobile communication devices responsive to the insight analysis query.

In another embodiment, the insight analysis can identify a selected snap-to-grid geographic reference point and a selected time duration comprising a plurality of time increments; and the insight analysis display can present location statistics including a number of mobile communication devices located proximate to the snap-to-grid geographic reference points during each time increment in the time duration.

In another embodiment, the insight analysis can identify a user associated with a selected mobile communication device, a selected time duration comprising a plurality of time increments; and the insight analysis display can present location statistics including a number of snap-to-grid geographic reference points where a mobile communication device associated with the user was located and representations of an amount of time that the mobile communication device was located proximate to each snap-to-grid geographic reference point.

In view of the foregoing, it will be appreciated that the present disclosure provides an improved snap-to-grid system. The specific systems and techniques for accomplishing the advantages described above will become apparent from

BRIEF DESCRIPTION OF THE DRAWINGS

FIG. 3 is a conceptual illustration of a graphical user interface in the snap-to-grid situational awareness system illustrating member location tracking by graphical coordinate.

FIG. is 5 a conceptual illustration of a graphical user interface in the snap-to-grid situational awareness system illustrating member location statistics provided for a number of selected snap-to-grid coordinates shown a tabular display.

FIG. is 6 a conceptual illustration of a graphical user interface in the snap-to-grid situational awareness system illustrating member location statistics provided for a number of selected snap-to-grid coordinates shown a map display.

FIG. is 7 a conceptual illustration of a graphical user interface in the snap-to-grid situational awareness system illustrating member location statistics provided for a number of selected snap-to-grid coordinates shown a pie chart display.

FIG. is 8 a conceptual illustration of a graphical user interface in the snap-to-grid situational awareness system illustrating aggregated member location statistics provided for a selected snap-to-grid coordinates shown a map display.

Figure 9:
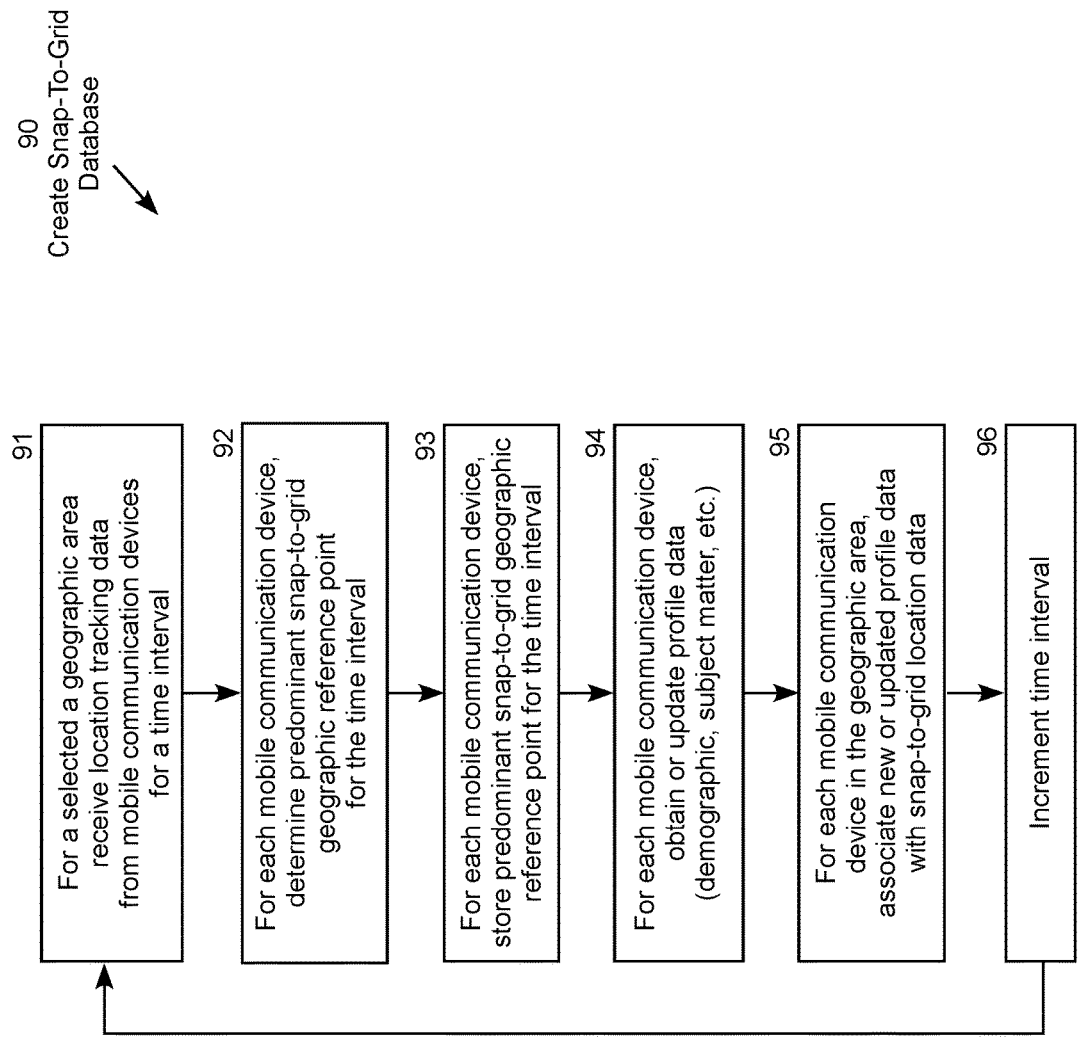

FIG. 9 is a logic flow diagram for creating a snap-to-grid database.

Figure 10:
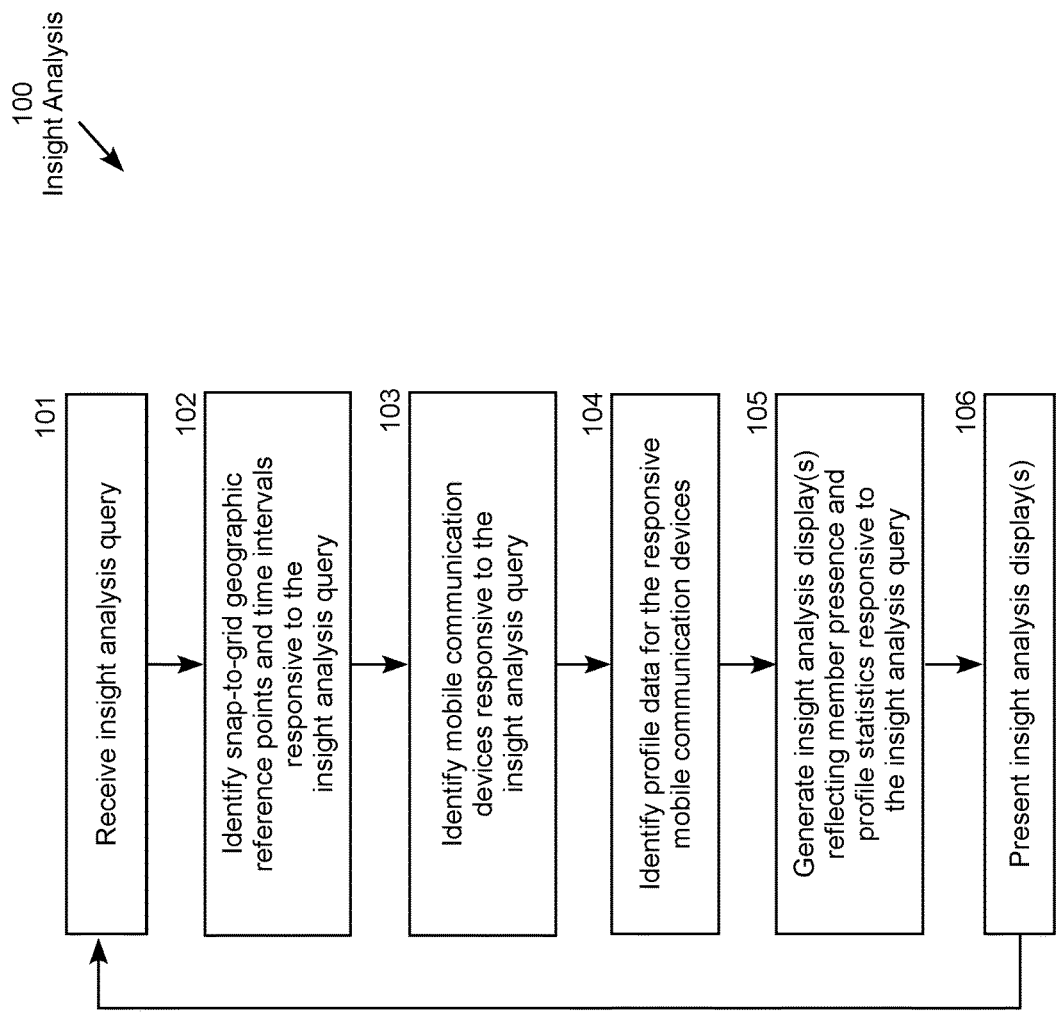

FIG. 10 is a logic flow diagram for conducting an insight analysis with a snap-to-grid database.

DETAILED DESCRIPTION OF ILLUSTRATIVE EMBODIMENTS

The invention may be embodied in a snap-to-grid situational awareness system that provides the ability to obtain historical information about the presence of mobile communication devices in particular areas over selected periods of time. It should be appreciated that a situational awareness system with the ability to track the locations of a large number of mobile communication devices over long periods of time could generate an enormous amount of location tracking data. For system members who allow location tracking, the snap-to-grid feature securely stores those location events and the time in which they occurred. The location events pile up quickly, and within weeks the situational awareness system would have to storing millions of records. Within months those numbers will be in the billions. Obviously as the system member base grows, and the scope of location tracking increases, the number of stored events will continue to increase even further.

The snap-to-grid system provides an efficient and practical way to store, aggregate, analyze, and display the situational awareness information. The snap-to-grid feature allows location tracking data to be aggregated, analyzed, and displayed for a limited number of snap-to-grid locations for a limited number of time increments. The snap-to-grid feature thus can provide a strategic utility to create, analyze and display a manageable location tracking data set. This approach facilitates scaling up of the situational awareness system to larger and larger numbers of members with location tracking. The snap-to-grid feature also allows a range of analyses and displays of situational awareness information on a snap-to-grid coordinate basis.

The snap-to-grid system provides an application that allows system customers to search on location history in real-time, meaning that the snap-to-grid system can effectively search billions of location history records under a second or within seconds. The snap-to-grid system also allows customers (users) to search by frequency (i.e. Users who were in location X3 or more times in the last month). To accomplish this, the snap-to-grid system comprises a number of features. First the snap-to-grid system can store raw data of location posts offline and in a separate, secure database. This provides efficiency so that the raw data does not have to be parsed to provide an output, thereby slowing down the processor. It also provides security/back-up by having data in multiple locations.

The snap-to-grid system may also create pre-materialized views per day. While not a completely accurate analogy, for the sake of brevity, that basically means the snap-to-grid system can create a separate pre-populated database from the raw data per day (e.g., if a user searches for people who were at X within the last 24 hours, the search takes place on a separate database than if the search was directed to people who were at x within the last 48 hours).

Additional information can be added into the pre-materialized views, such as the number of times they have been to the location. The snap-to-grid system can align with an instant response and situational awareness system by adding a dimension of behavioral based data. This could be used, for example, to provide an estimate of potential locations of a particular user's clients. This matters so that users can target people who have been in a specific area for a certain length of time and a certain frequency.

This system also provides predictability. For example, by knowing how many mobile devices on average are at Roam workspace on certain days, a user can tailor their marketing/sales strategy to take advantage of that. The user can the send targeted notices, adds, queries, promotional offers and coupons in advance. The system could also influence behavior by offering coupons/deals to go to a specific place during a specific time. Members who are being tracked can opt into or out of direct messages (e.g., coupons) based on time or range of other factors. For example, if Uber can cross-reference this database for specific times (new years eve), Uber can obtain a useful estimate of how many cars to deploy to specific areas based on specific times. The system can also generate a snap-to-grid based on the influenced behavior—meaning that, but for the target coupon, John Doe would've been predicted to stay at home all day instead of going to Target and have a snap-to-grid taken there.

The snap-to-grid feature can be an add-on to a preexisting situational awareness or instant response system because an element of behavioral based polling can then be added to the situational awareness system or instant response system. The resulting snap-to-grid system can be used to provide real-time and predictive analysis of traffic conditions—as more mobile devices snap to a specific grid on the interstate, the inference of heavy traffic can be increased.

The snap-to-grid system can leverage the fact that the majority of location posts will probably be duplicate information (i.e. people tend to remain in their office and home locations for a large majority of the day and the majority of location posts will be from the same reference locations). However, locations can be infinite, given the level of detail someone can be at (e.g., 5 ft, 5 inches, etc. away from where you were and this is considered a different location). Therefore, the snap-to-grid system can take an infinite set of possibilities and reduce that data into a finite set of possibilities by snapping locations to a self-defined grid.

The snap-to-grid system may periodically or on demand delete records from the secondary database. By doing so, the system can eliminate millions (if not billions) of duplicate records and improve frequency calculation. For example, the snap-to-grid system could turn someone's 100 location posts, within the last 24 hours, from their house, into 1 location post within their house with a simple, extra field noting a frequency of 100. Meaning 100 database records just got turned into 1 database record with more information on it. The snap-to-grid system can be a predetermined grid size. Grids can also be built according to the venue (size specific—AMC could have a different grid system than Walmart).

Mobile device users may select certain places where they do not want their device to have their locations recorded. The snap-to-grid system may snap reporting devices to the closest point of intersection between four grid quadrants (other shapes can be used as well). The grid can be built on previous populations of people. The grid can be dynamic and adaptive where it is based on peoples' current location. The grid can be a combination of two or more of the above. Grids can be overlaid. Grids can be finer depending upon the number of locations anticipated by the number of people. Multiple separate databases (e.g., live database, storage database) may be created on a periodic time (every day, night, week, etc.). The storage database can generate a view of the 1 day, 2 days, 3 days, etc. views.

Communication may occur between multiple snap-to-grid databases, where one database is a real-time database. Another database may store the raw data (infinite amount of points). Users can query based on how long others were at a specific location. Instead of showing 50 points for one person being near a specific area 50 times, the system can show one snap-to-grid with the number 50 next to it. After views are generated, the storage database may send the data to the live database in a snap-to-grid format.

The snap-to-grid feature can be utilized as a stand-alone database and insight system or as part of a more sophisticated situational awareness system with or without interrogation features. For example, the snap-to-grid feature can be utilized in concert with the situational awareness and instant response systems described in U.S. Pat. Nos. 9,894,077 and 9,965,556, which are incorporated by reference.

Figure 1:
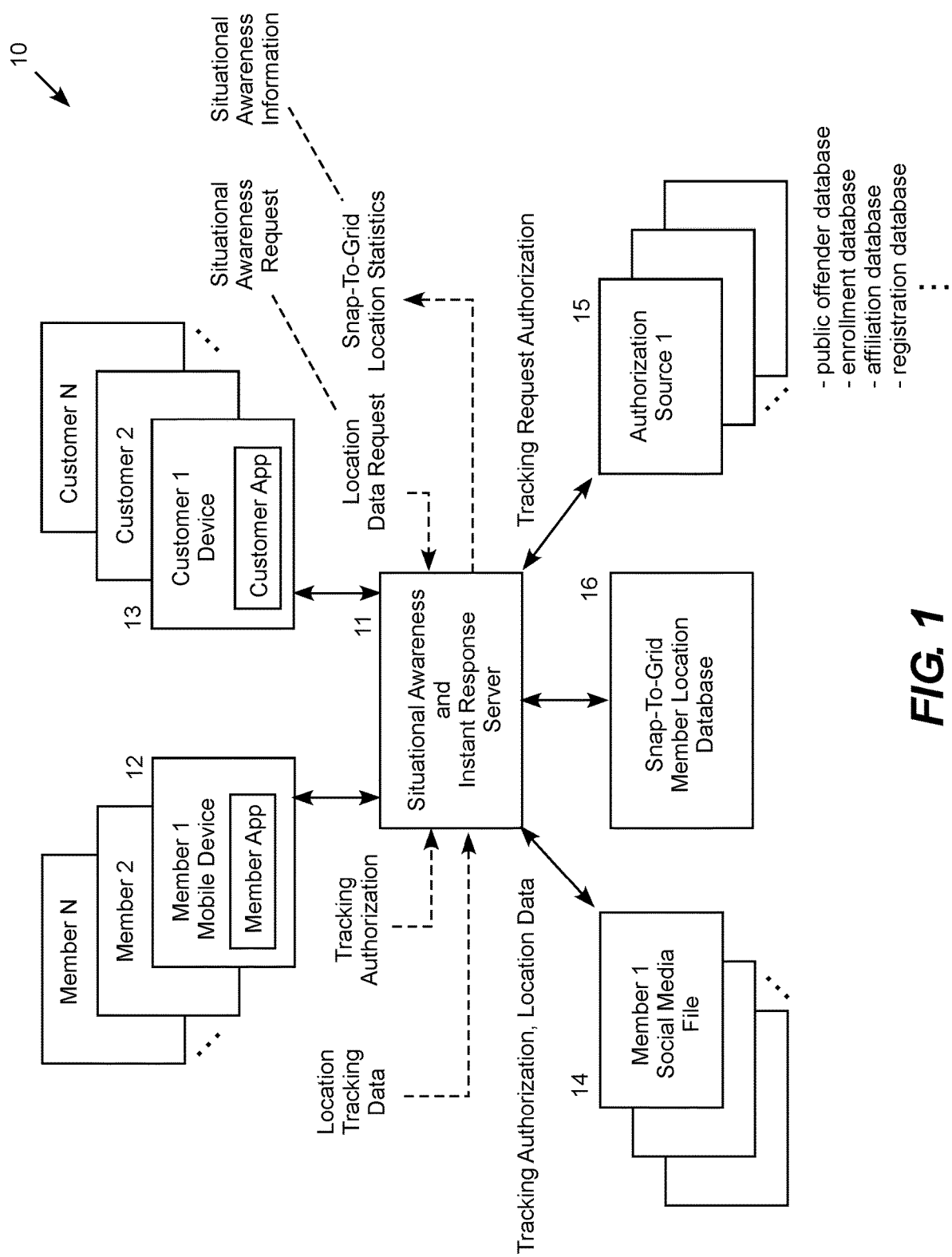
FIG. 1 is a functional block diagram of the "snap-to-grid" situational awareness system.

FIG. 1 is a functional block diagram of the "snap-to-grid" situational awareness system 10, which can comprise a situational awareness server and instant response server 11 in a network computer that communicates with a number of mobile communication devices 12, such as smartphones, carried by system participants referred to as members (also referred to as users, potential survey participants, prospects or candidates). In general, members can provide location tracking from their mobile communication devices and make profile data containing demographic and subject matter of interest information available to other members and system customers. Members can also make other data available for system use, such as settings data, authorization data, and so forth. Members of the situational awareness system can typically enroll or otherwise participate in the system so that they can receive notices, such as travel, public service, group-specific, or promotional service notices. Members of the situational awareness system may also participate in the system to obtain situational awareness information about other members of the system. Members of the situational awareness system may also participate in the instant response system, which allows them to participate in surveys (also called polls or interrogations) in exchange for per-response fees, which they may receive as income or donate to a charity selected by the member or the system operator.

The situational awareness server and instant response server 11 can communicate with the mobile communication devices 12 carried by the members through the wireless telecommunication network. The mobile communication devices 12 carried by the members can use an app provided by the operator of the system 10 to interact with the server 11 and store associated data and settings. Although other communication media may be used, members can receive and respond to online surveys through text messages.

The situational awareness server and instant response server 11 can also communicate with a number of customers devices 13, which may be computer devices operated by members as well as other entities that want to reach members, such as advertisers, travel advisory services, public service providers, and so forth. Customers can be users of the system who can place situational awareness requests to receive situational awareness about members. Customers may also place survey or poll requests to receive responses from members, which customers typically pay for surveys on a per-response basis. In some cases, customers may also reach out to engage in direct communication with survey respondents or members identified in situational awareness information, typically with the consent of the member to be contacted. The situational awareness server and instant response server 11 can communicate with the customer devices 12 over the Internet, a private network, or through the wireless telecommunication network depending on the types of devices used by the various customers. The customer devices 13 can use an app provided by the operator of the system 10 to interact with the server 11 and store associated data and settings. The server 11 can provide a menu-drive user interface to assist users of the customer devices 13 in defining situational awareness requests, viewing situational awareness information (typically provided as demographic statistics), defining survey requests, viewing survey results (also typically provided as demographic statistics), and related activities.

While the member apps running on the member mobile devices may contain sufficient settings data, location data, and member profile data to allow the members to participate in situational awareness requests and online surveys, the server 11 may additionally or alternatively access the member's social media files 14 to obtain or augment this data. For example, member settings data, location tracking data, demographic data, or subject matter of interest data may be maintained in whole or in part in the social media files 14. Information about a member's participation in the system 10 (e.g., number of surveys completed, amount earned or donated to charity, subject matter areas of interest, subject matter areas of expertise, member group participation, product reviews, travel information, etc.) may also be maintained in a member's social media file as a way to inform others about the member's participation in the system 10. Social media can therefore provide an important connection between the member and the member's participation in the system 10.

The server 11 may also communicate with one or more authorizations sources 15 when managing member and customer participation in the system 10. For example, a public offender database may be consulted to determine whether to allow certain customers to gain situational awareness about certain members or types of members (e.g. minors). As another example, certain situational awareness or survey requests may be limited to customers or members enrolled in certain groups, such as students enrolled at a particular school, employees of a particular company, patients taking a particular prescription, persons registered as members of a particular political group, or a special-purpose created for system utilization (e.g., family group, church group, travel group, etc.).

As the number of system users enabling location tracking increases, the amount of data that would be required to record all locations of all members over time can quickly grow into an enormous and unmanageable data set. The system 10 therefore comprises a snap-to-grid member location database 16 that creates a manageable number of geographic and time reference points for recording member locations. While each member's real-time location is tracked at the resolution level available through their mobile device's GPS tracking (currently in the four-meter range in much of the United States), their locations are recorded and stored for later retrieval at a coarser resolution, such as the decimal degree latitude and longitude system with two decimal point resolution (roughly in the range of 500 to 1,000 meters range), or three decimal resolution (roughly in the range of 50 to 100 meters). In other words, each member's location can be recorded or "snapped-to-grid" based on the closet decimal degree latitude and longitude geographic reference point at the selected decimal point resolution. Each such reference point may also be tagged with a geographic feature of note near the reference point, such as an address, park name, highway mile marker, and so forth. Once the nearest reference point locations of a large number of members has been stored over a period of time to create a snap-to-grid member location database, a range of different queries can be conducted to analyze member presence data by member and by geographic reference point as a function of time.

Figure 2:
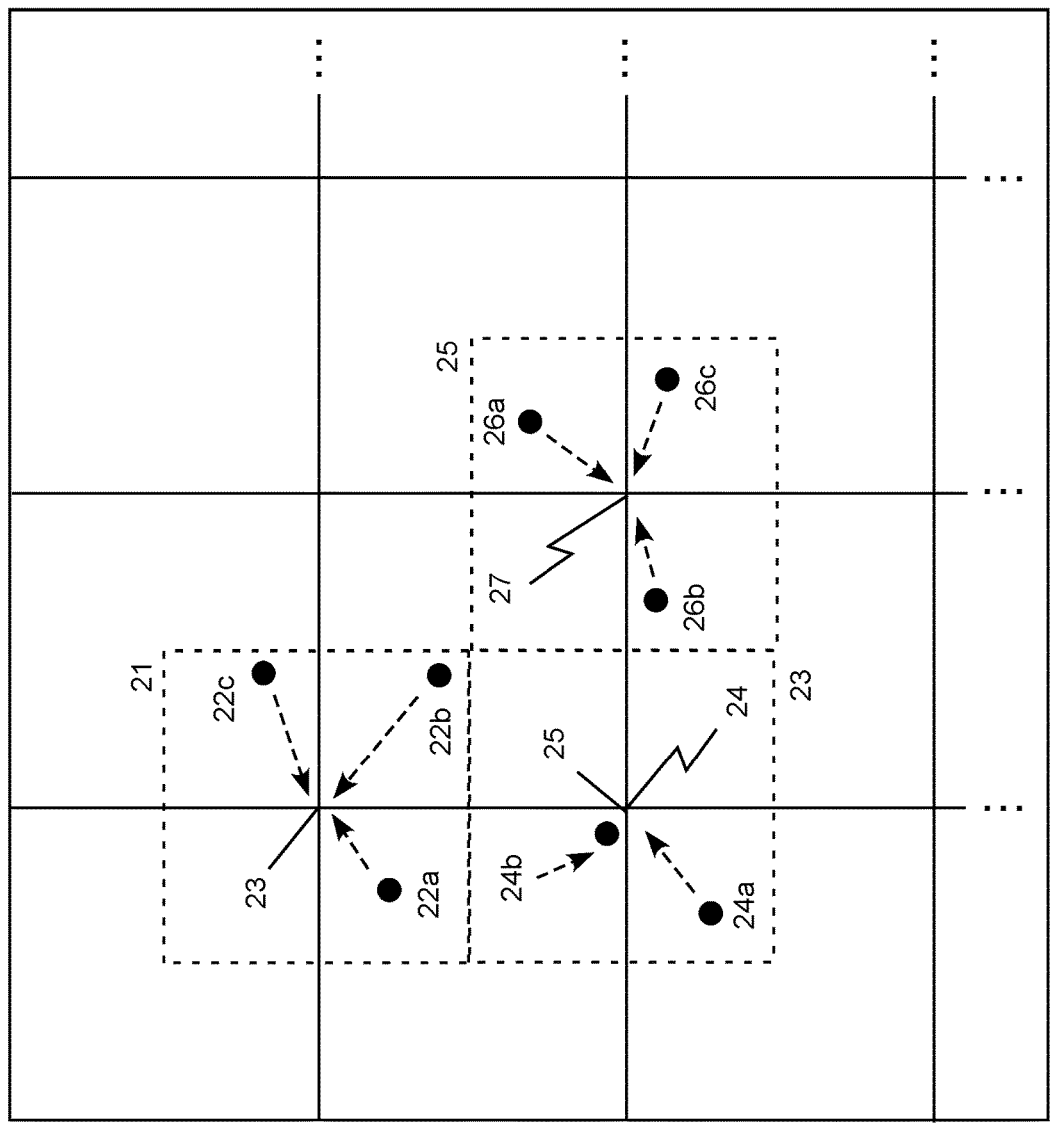
FIG. 2 is a conceptual illustration of the "snap-to-grid" procedure as used in the situational awareness system.

FIG. 2 is a portion of a geographic map 20 illustrating the snap-to-grid feature. The geographical area of interest can be divided into a grid in which the grid lines intersections serve as snap-to-grid coordinates. The location tracking data for tracked devices can then be assigned to the geographically closest snap-to-grid coordinate, and data for all of the location-tracked devices can be aggregated by the snap-to-grid coordinate. In this example, the locations for mobile devices 22a-c in the area 21 closest to the grid reference point 23 are recorded as the location of the grid reference point 23; the locations for mobile devices 24a-c in the area 23 closest to the grid reference point 25 are recorded as the location of the grid reference point 25; the locations for mobile devices 26a-c in the area 25 closest to the grid reference point 27 are recorded as the location of the grid reference point 27; and so forth. Aggregated tracking data can then be captured and stored for each snap-to-grid coordinate (geographic reference point) for a limited set of selected time intervals. In this example, the grid coordinates 23, 25 and 27 are the geographic reference points. For example, the snap-to-grid coordinate may be defined for decimal degree latitude and longitude coordinates with a selected decimal point resolution, such as 2 or 3 decimal point resolution. As another option, grid lines may be defined for every thousand feet (1,000 ft), every half-mile or every mile. The aggregated tracking may be captured and stored for each snap-to-grid coordinate every ten minutes (10 min.) or any other suitable temporal interval.

The snap-to-grid resolution or granularity parameters (e.g., coordinate distance, and data capture time intervals) may be user-defined parameters. A master data set created and stored at the maximum resolution (smallest granularity), from which working data sets for specific geographic areas, time periods and resolution may be extracted and provided to customers on a fee bases. The desired geographic areas, time periods and resolution may be customer defined, where each customer has the ability to select their preferred data set, on an analysis-by-analysis basis, based on cost and other factors. Once a specific snap-to-grid data set has been selected for analysis (e.g., for a specific geographic area, time period and resolution) a wide range of statistical analyses may be defined, performed and displayed on a case-by-case basis. FIGS. 3-8 represent several "insight analysis" queries and associated user interfaces for viewing the data in the snap-to-grid database to illustrate the features and capabilities of the snap-to-grid system. These specific examples are merely illustrative, as other queries and visual presentations of the snap-to-grid data may be defined as a matter of design choice once the features and capabilities of the snap-to-grid system are understood.

FIG. 3 is a conceptual illustration of a graphical user interface 30 in the snap-to-grid situational awareness system illustrating member location tracking by geographic reference point (coordinate). FIG. 3 shows an example where location data for the members is organized member-by-member in a series of member tables 32a-n. The location for an illustrative member (George Burdell) is displayed in table 32a by snap-to-grid coordinate for specified time intervals. In this example, the snap-to-grid coordinate is shown by latitude, longitude coordinate as well as a "coordinate landmark" assigned by the corresponding coordinate by the map designer. In this example, the user selects a particular member (George Burdell) and specific time intervals. For each row of the table 32a, the situational awareness system returns the snap-to-grid coordinate and coordinate landmark where the selected member (George Burdell) was located for the preponderance of the associated time interval.

Figure 4:
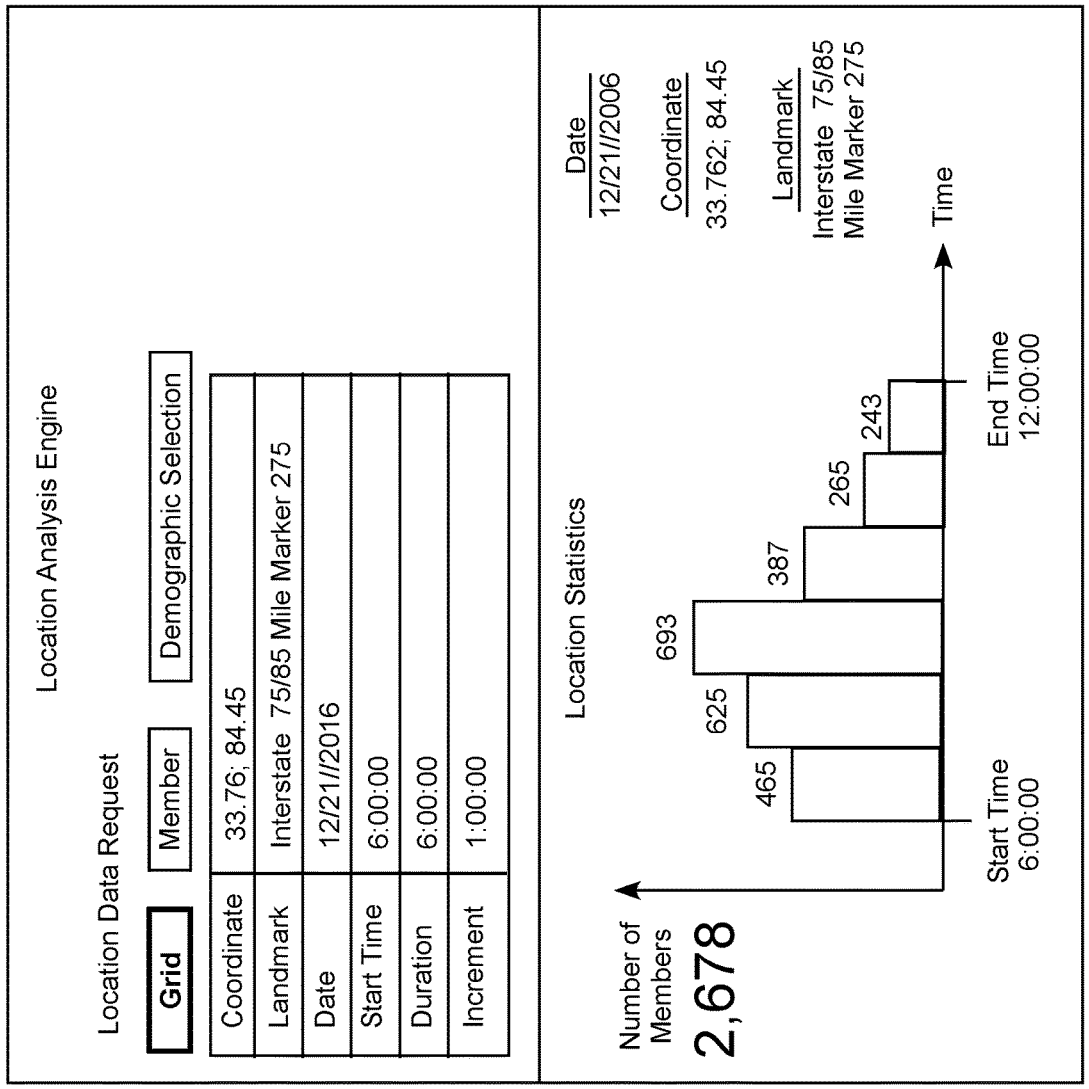
FIG. 4 is a conceptual illustration of a graphical user interface in the snap-to-grid situational awareness system illustrating demographic statistics provided on for a selected snap-to-grid coordinate.

FIG. 4 is a conceptual illustration of a graphical user interface 40 in the snap-to-grid situational awareness system illustrating demographic statistics provided for a selected snap-to-grid coordinate. The user selects a grid coordinate (in this particular example, Latitude 33:76; Longitude 84.42; Landmark Interstate 75/85, Mile Marker 275) and time intervals (in this particular example, Start Time 6:00:00, Duration 6:00:00, Increment 1:00:00). The system returns aggregate statistics for members located at the selected snap-to-grid geographic reference point for the preponderance of the associated time intervals (in this particular example, a bar graph showing 2,678 members over the period from 6:00:00 to 12:00:00 in one-hour increments). The user may also obtain demographic statistics for the members aggregated into any particular data point. For example, the user may obtain the age, sex, and home zip code demographics (or any other demographic parameter, subject matter of interest parameter, or other item available in the profile data accessible to the system) for the 465 members aggregated at the selected coordinate during the hour from 6:00:00 to 7:00:00, for the 625 members aggregated at the selected coordinate during the hour from 7:00:00 to 8:00:00, for the 693 members aggregated at the selected coordinate during the hour from 8:00:00 to 9:00:00, etc.

Figure 5:
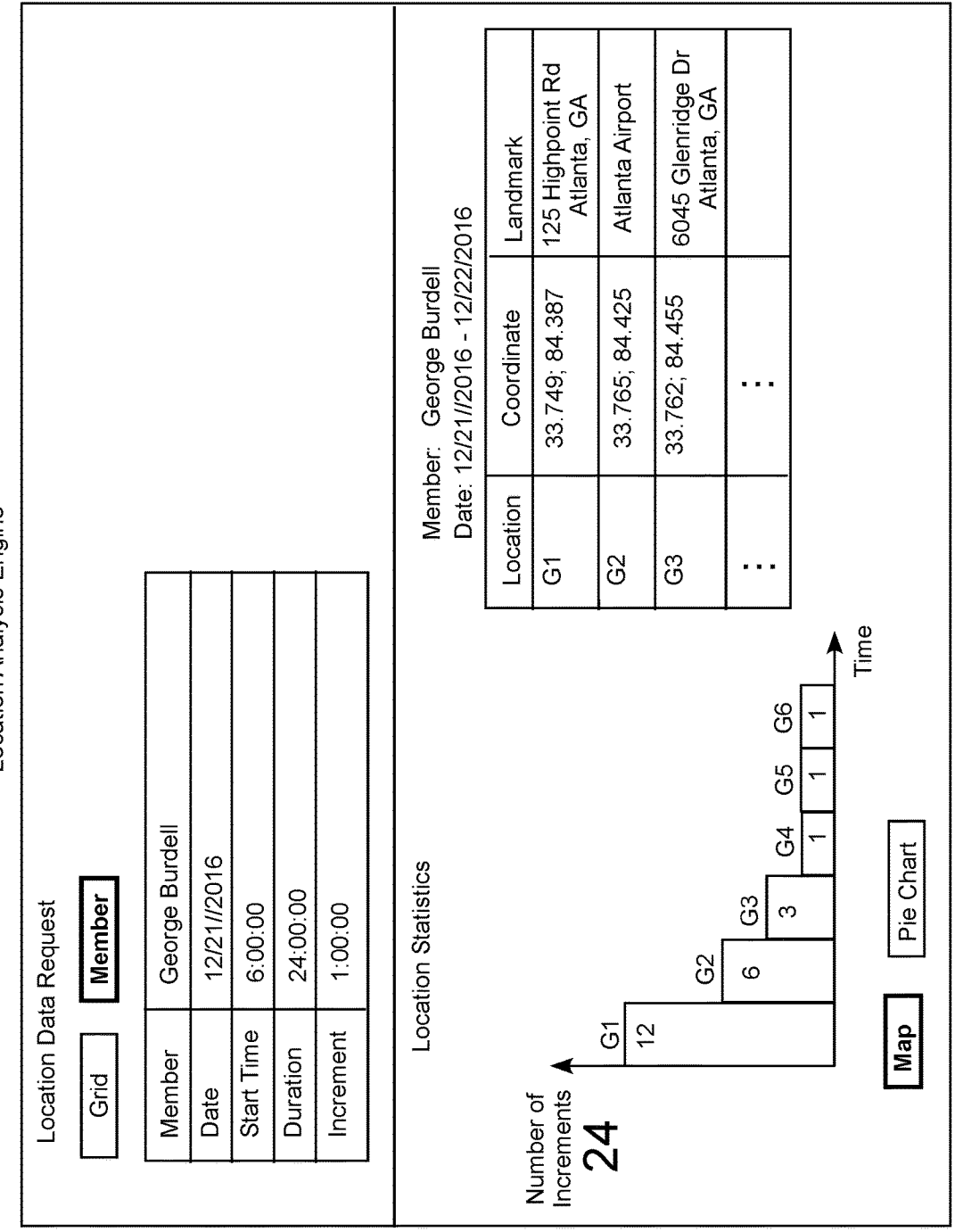

FIG. 5 is a conceptual illustration of a graphical user interface 50 in the snap-to-grid situational awareness system illustrating a member's location statistics provided by selected snap-to-grid geographic reference point (coordinate) for a period of time. In this example, the user selects a particular member (George Burdell) and a desired time period (Start Time 6:00:00, Duration 24:00:00, Increment 1:00:00). The system returns the grid points and durations where the selected member (George Burdell) was located (12 hours at grid point G1, 6 hours at grid point G2, 3 hours at grid point G3, and so forth). An associated table identifies the grid points (G1 is latitude/longitude coordinate: 33.749, 84.387, landmark: 125 Highpoint Road, Atlanta, Ga.; G2 is latitude/longitude coordinate: 33.765, 84.425, landmark: Atlanta Airport; G3 is latitude/longitude coordinate: 33.762, 84.455, landmark: 6045 Glenridge Drive, Atlanta, Ga.; and so forth). The identified grid points may be sorted in any desired order. This example shows grid points sorted from most to least frequently visited. FIG. 3, on the other hand, shows similar data displayed by time interval in the order visited.

Figure 6:
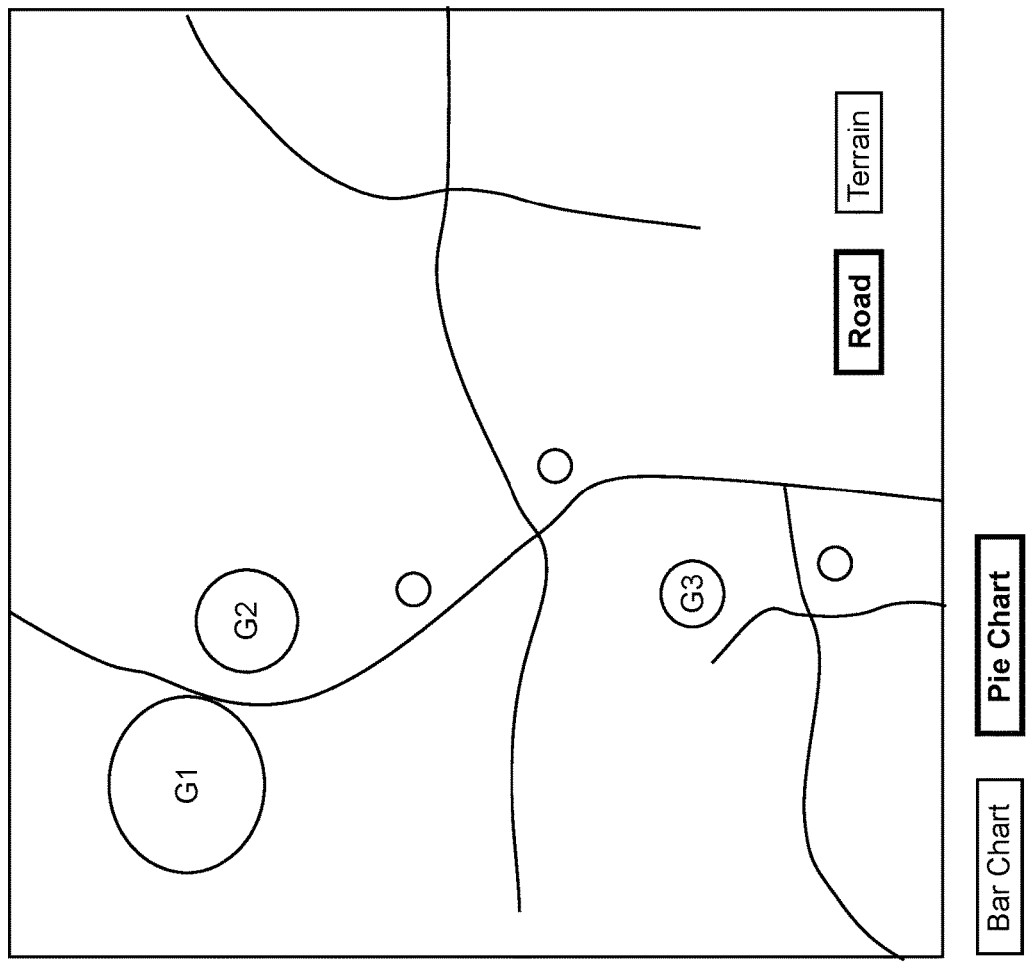
Figure 7:
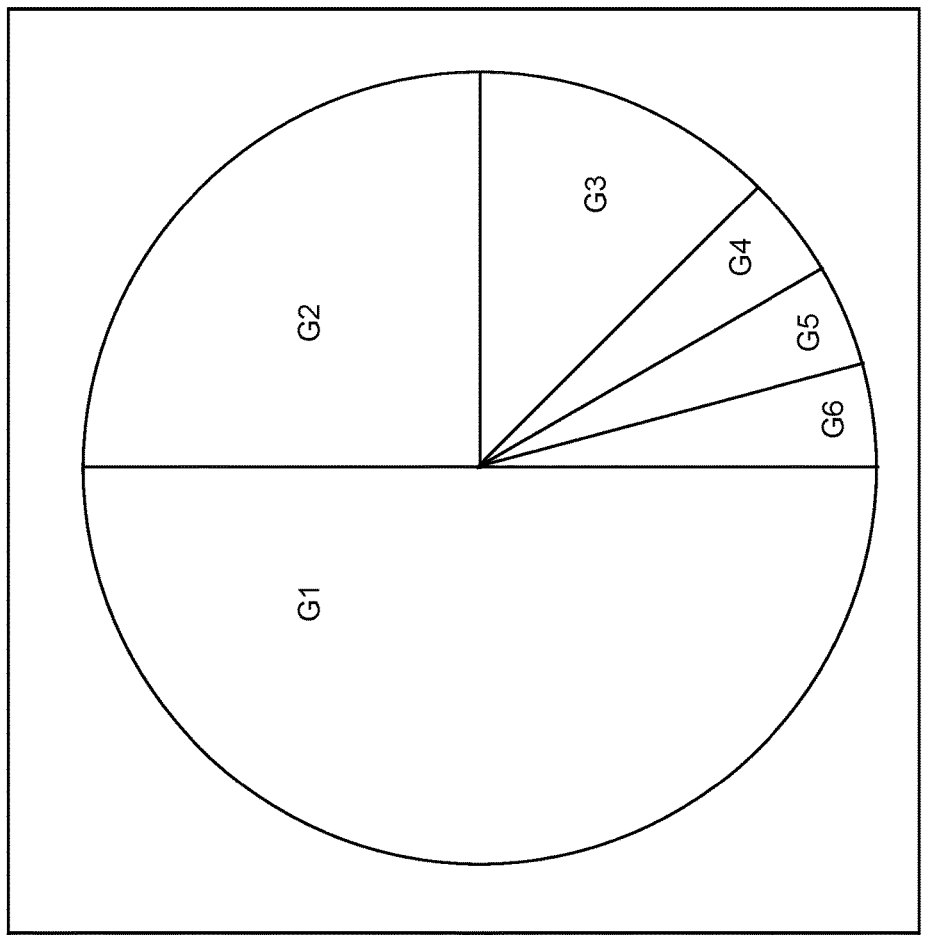

FIG. 6 is a conceptual illustration of a graphical user interface 60 in the snap-to-grid situational awareness system illustrating member location statistics provided for a number of selected snap-to-grid coordinates shown a map display. In this example, the same data shown in FIG. 5 in tabular form is shown in graphical form, in which the size of each circle around a corresponding grid point can represent the amount of time the member was located at that particular data point. FIG. 7 shows another alternative view 70 in which the same data is shown as a pie chart.

Figure 8:
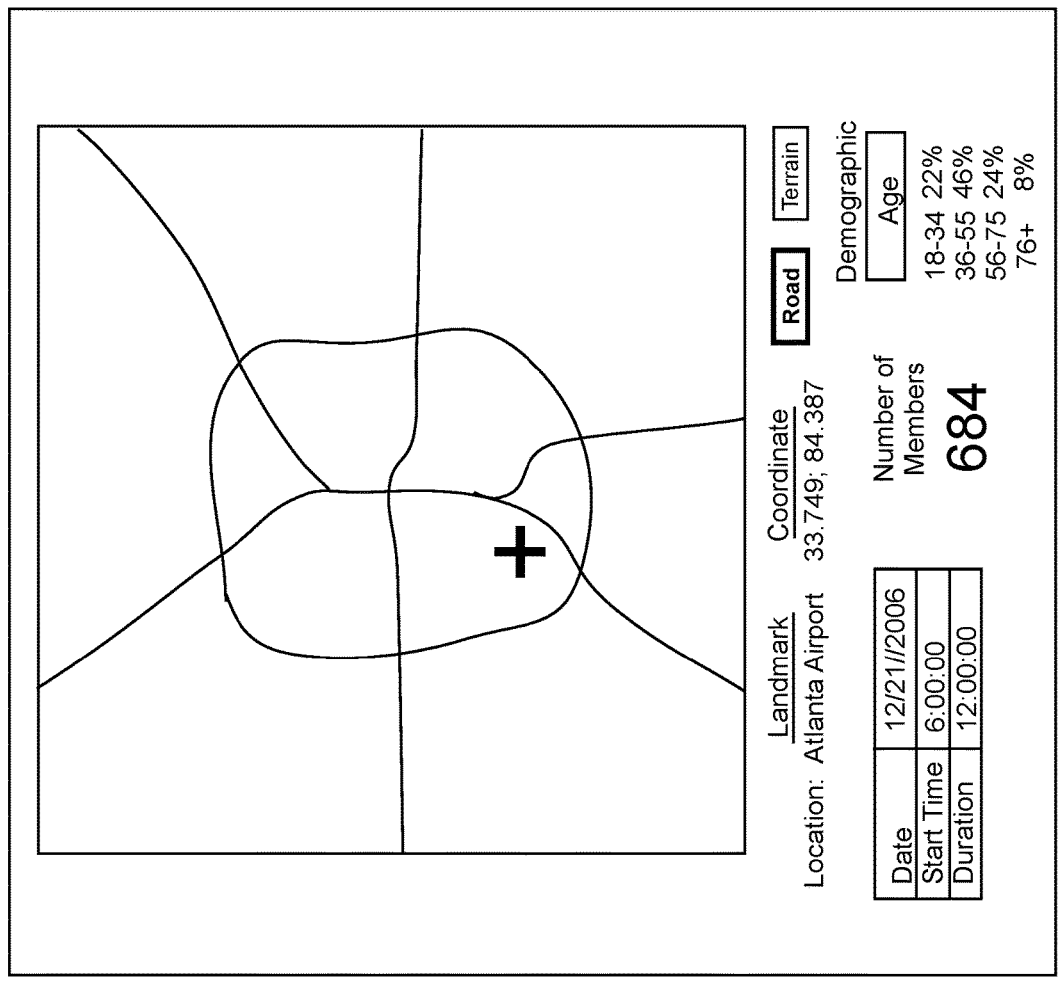

FIG. 8 is a conceptual illustration of a graphical user interface 80 in the snap-to-grid situational awareness system illustrating aggregated member location statistics provided for a selected snap-to-grid coordinate shown a map display. In this example, the user selects a particular geographic reference or grid point (latitude/longitude coordinate: 33.749; 84.387, landmark: Atlanta Airport) and time interval (Time 6:00:00, Duration 12:00:00), and the system returns aggregate data for members located at that grid point over the specified time period. This example is useful to provide traffic studies, for example. The system can also return profile data, such as demographic statistics, for the aggregate member data. FIG. 8 represents a graphical display of the same type of data shown in tabular form in FIG. 4.

FIG. 9 is a logic flow diagram 90 for creating a snap-to-grid database. In step 91, for a selected a geographic area, the snap-to-grid system receives location tracking data from mobile communication devices for a time interval. The geographic area and time interval are selected to provide the desired resolution for the snap-to-grid database. For example, the geographic area may be a state, region or country and the time interval may be in the range of 10 to 30 minutes. Step 91 is followed by step 92, in which, for each mobile communication device providing location data in step 91, the system determines a predominant snap-to-grid geographic reference point for the time interval. In other words, the system determines the reference point that the mobile communication device was closest to for the largest portion of the time interval. Step 92 is followed by step 93, in which, for each mobile communication device providing location data in step 91, the system stores the predominant snap-to-grid geographic reference point. Step 93 is followed by step 94, in which, for each mobile communication device providing location data in step 91, the system obtains new or updated profile data for the member associated with the mobile communication device. For example, the profile data may include new or updated demographic data, subject matter of interest data, settings data, permissions data, authorization data, and so forth.

As shown in FIG. 1, the system may obtain or update the profile data from a variety of sources, such as the member's mobile communication device 12 (e.g. the member app running on the member's mobile communication device), the member's social media file 14, one or more authorization sources 15 containing data pertaining to the member (e.g., public offender databases, enrollment databases, etc.), and other data sources with information pertaining to the member (e.g., a mobile communication system home or visitor location registers, customer loyalty databases, traveler databases, political affiliation databases, etc.). Step 94 is followed by step 95, in which, for each mobile communication device providing location data in step 91, the system stores the member's new or updated profile data in the snap-to-grid database in association with the snap-to-grid location record for the member. This allows the snap-to-grid database to maintain all of the data necessary to conduct insight analyses using the data in the snap-to-grid database without having to obtain profile data from outside sources at the time of the insight analysis request, which improves the response time for the insight analyses. Step 95 is followed by step 96, in which the system increments the time interval and then loops back to step 91 for another iteration updating the snap-to-grid database.

FIG. 10 is a logic flow diagram 100 for conducting an insight analysis with a snap-to-grid database. In step 101, the snap-to-grid system receives an insight analysis query, typically through a menu-driven graphical user interface. Step 101 is followed by step 102, in which the system identifies the snap-to-grid geographic reference points and time intervals in the snap-to-grid database responsive to the insight analysis query. Step 102 is followed by step 103, in which the system identifies the mobile communication devices in the snap-to-grid database responsive to the insight analysis query. Step 104 is followed by step 105, in which the system generates insight analyses displays reflecting member presence and profile statistics responsive to the insight analysis query. Step 105 is followed by step 106, in which the system presents the insight analyses displays. FIGS. 3-8 represent the types of insight analysis displays the system can provide with the data stored in the snap-to-grid database. A wide range of statistics can also be presented for member cohorts identified by the insight analyses based on information contained in the profile data, such as geographic location statistics, demographic statistics (e.g., age, race, sex, income, education, etc.), subject matter of interest statistics (e.g., sports team affiliation statistics, political affiliation statistics, medical condition statistics, etc.), traveler status statistics (e.g., visitor, home location, duration of stay, etc.).

Alternative Embodiments

The present disclosure may be implemented on portable computing devices, which may communicate with a server system providing access to a number of client systems over a network, or as a dedicated computing system. As such, embodiments of the disclosure may comprise adapting or reconfiguring presently existing equipment. Alternatively, original equipment may be provided embodying the disclosure.

All of the methods described in this disclosure may include storing results of one or more steps of the method embodiments in a non-transient storage medium. The results may include any of the results described in this disclosure and may be stored in any manner known in the art. The storage medium may include any storage medium described in this disclosure or any other suitable storage medium known in the art. After the results have been stored, the results can be accessed in the storage medium and used by any of the method or system embodiments described in this disclosure, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

Those having skill in the art will appreciate that there are various vehicles by which processes and/or systems and/or other technologies described in this disclosure can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described in this disclosure may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth in this disclosure, and then use engineering practices to integrate such described devices and/or processes into data processing systems. That is, at least a portion of the devices and/or processes described can be integrated into a data processing system via a reasonable amount of experimentation. Those having skill in the art will recognize that a typical data processing system generally comprises one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. All of the technology described in this disclosure is suitable for implementation using commercially available computing devices, such as network servers operated by the situational awareness system and smartphones or personal computers operated by members and customers. These computing devices may be interconnected via the Internet, mobile telephone voice and data system, or other data suitable network.

This disclosure sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components may be combined to achieve a particular functionality can be seen as "associated with" each other such that the desired functionality is achieved, irrespective of architectures or intermediate components. Likewise, any two components so associated can also be viewed as being "connected", or "coupled", to each other to achieve the desired functionality, and any two components capable of being so associated can also be viewed as being "functionally connected" to each other to achieve the desired functionality. Specific examples of functional connection include but are not limited to physical connections and/or physically interacting components and/or wirelessly communicating and/or wirelessly interacting components and/or logically interacting and/or logically interacting components.

While particular aspects of the present subject matter have been shown and described in detail, it will be apparent to those skilled in the art that, based upon the teachings of this disclosure, changes and modifications may be made without departing from the subject matter described in this disclosure and its broader aspects and, therefore, the appended claims are to encompass within their scope all such changes and modifications as are within the true spirit and scope of the subject matter described in this disclosure. Although particular embodiments of this disclosure have been illustrated, it is apparent that various modifications and embodiments of the disclosure may be made by those skilled in the art without departing from the scope and spirit of the disclosure. Accordingly, the scope of the disclosure should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. The disclosure is defined by the following claims, which should be construed to encompass one or more structures or function of one or more of the illustrative embodiments described above, equivalents and obvious variations.

The invention claimed is:

1. A method for providing situational awareness information associated with mobile communication devices comprising: creating a snap-to-grid database comprising a plurality of snap-to-grid location reference point by:
   (a) for a selected location area, receiving location tracking and profile data from a plurality of mobile communication devices for a time interval,
   (b) for each mobile communication device providing the location tracking and profile data for the time interval, determining a predominant one of the snap-to-grid location reference points for the time interval,
   (c) for each mobile communication device providing the location tracking and profile data for the time interval, storing the predominant snap-to-grid location reference point for the time interval in a location record for the mobile communication device in a snap-to-grid database,
   (d) continually incrementing the time interval and repeating steps (a) through (c) for a selected number of time intervals to create time interval data comprising location tracking and profile data for each time interval for a plurality of the snap-to-grid location reference points;

storing the time interval data in a snap-to-grid location database; aggregating the time interval data for a selected number of time intervals;

storing the aggregated time interval data for the snap-to-grid location reference points in an online situational awareness database; and providing situational awareness information by:

receiving an insight analysis request comprising a selected map location and a selected time period comprising multiple time intervals;

retrieving time interval data responsive to the situational awareness request from the situational awareness database comprising a number of mobile communication devices associated with one of the snap-to-grid location reference points associated with the selected map location for each time interval in the selected time period;

computing a statistical representation of the retrieved time interval data; and displaying on the display device an insight analysis display comprising a visual representation the statistical representation of the retrieved time interval data representation together with a graphical representation of a geographic map location comprising the selected map location.

2. The method of claim 1, wherein the insight analysis display further comprises a statistical representation of demographic statistics for user identities associated with the mobile communication devices responsive to the insight analysis request.

3. The method of claim 2, wherein the profile data comprises demographic data obtained from the mobile communication devices.

4. The method of claim 2, wherein the profile data comprises data obtained from a profile database.

5. The method of claim 2, wherein the profile data comprises demographic data obtained from social media files associated with the mobile communication devices.

6. The method of claim 2, wherein the profile data comprises data obtained from an enrollment database.

7. The method of claim 2, wherein the profile data comprises data obtained from an affiliation database.

8. A computer storage medium storing non-transient computer executable instructions causing a computer-controlled devices to perform a method for providing situational awareness information associated with mobile communication devices comprising: creating a snap-to-grid database comprising a plurality of snap-to-grid location reference point by:

(a) for a selected location area, receiving location tracking and profile data from a plurality of mobile communication devices for a time interval, (b) for each mobile communication device providing the location tracking and profile data for the time interval, determining a predominant one of the snap-to-grid location reference points for the time interval, (c) for each mobile communication device providing the location tracking and profile data for the time interval, storing the predominant snap-to-grid location reference point for the time interval in a location record for the mobile communication device in a snap-to-grid database, (d) continually incrementing the time interval and repeating steps (a) through (c) for a selected number of time intervals to create time interval data comprising location tracking and profile data for each time interval for a plurality of the snap-to-grid location reference points;

storing the time interval data in a snap-to-grid location database; aggregating the time interval data for a selected number of time intervals;

storing the aggregated time interval data for the snap-to-grid location reference points in an online situational awareness database; and providing situational awareness information by:

receiving an insight analysis request comprising a selected mobile communication device and a selected time period comprising multiple time intervals;

retrieving time interval data responsive to the situational awareness request from the situational awareness database comprising a number time intervals of the selected time period that the selected mobile communication device is associated with each of a plurality of the snap-to-grid location reference points;

computing a statistical representation of the retrieved time interval data; and displaying on the display device an insight analysis comprising a visual representation the statistical representation of the retrieved time interval data representation together with a graphical representation of a geographic map location comprising the selected map location.

9. The computer storage medium of claim 8, wherein the insight analysis display further comprises a demographic information for a user identity associated with the mobile communication device identified in the insight analysis request.

10. The computer storage medium of claim 9, wherein the profile data comprises demographic data obtained from the mobile communication devices.

11. The computer storage medium of claim 9, wherein the profile data comprises data obtained from a profile database.

12. The computer storage medium of claim 9, wherein the profile data comprises demographic data obtained from social media files associated with the mobile communication devices.

13. The computer storage medium of claim 9, wherein the profile data comprises data obtained from an enrollment database.

14. The computer storage medium of claim 9, wherein the profile data comprises data obtained from an affiliation database.

15. A computer-controlled device comprising a controller programmed to cause the device to perform a method for providing situational awareness information associated with mobile communication devices comprising:

creating a snap-to-grid database comprising a plurality of snap-to-grid location reference point by:

(a) for a selected location area, receiving location tracking and profile data from a plurality of mobile communication devices for a time interval, (b) for each mobile communication device providing the location tracking and profile data for the time interval, determining a predominant one of the snap-to-grid location reference points for the time interval, (c) for each mobile communication device providing the location tracking and profile data for the time interval, storing the predominant snap-to-grid location reference point for the time interval in a location record for the mobile communication device in a snap-to-grid database, (d) continually incrementing the time interval and repeating steps (a) through (c) for a selected number of time intervals to create time interval data comprising location tracking and profile data for each time interval for a plurality of the snap-to-grid location reference points;

storing the time interval data in a snap-to-grid location database;

aggregating the time interval data for a selected number of time intervals;

storing the aggregated time interval data for the snap-to-grid location reference points in an online situational awareness database; and providing situational awareness information by: receiving an insight analysis request comprising a selected map area and a selected time period comprising multiple time intervals;

retrieving time interval data responsive to the situational awareness request from the situational awareness database comprising a plurality of snap-to-grid location reference points associated with the selected map area, a number of mobile communication devices associated with each of the snap-to-grid location reference points associated with the selected map, and a number of the mobile communication devices associated each of the snap-to-grid location reference points associated with the selected map for each time interval of the selected time period;

computing a statistical representation of the retrieved time interval data; and displaying on the display device an insight analysis comprising a visual representation the statistical representation of the retrieved time interval data representation together with a graphical representation of a geographic map location comprising the selected map location.

16. The computer-controlled device of claim 15, wherein the insight analysis display further comprises a statistical representation of demographic statistics for user identities associated with the mobile communication devices responsive to the insight analysis request.

17. The computer-controlled device of claim 16, wherein the profile data comprises demographic data obtained from the mobile communication devices.

18. The computer-controlled device of claim 16, wherein the profile data comprises data obtained from a profile database.

19. The computer-controlled device of claim 16, wherein the profile data comprises demographic data obtained from social media files associated with the mobile communication devices.

20. The computer-controlled device of claim 16, wherein the profile data comprises data obtained from an enrollment database or an affiliation database.

* * * * *